United States Patent [19]

Sederquist et al.

[11] Patent Number: 5,718,881
[45] Date of Patent: Feb. 17, 1998

[54] CATALYTIC REACTOR DESIGNED TO REDUCE CATALYST SLUMPING AND CRUSHING

[75] Inventors: Richard A. Sederquist, Newington; Thomas J. Corrigan, Vernon; Donald F. Szydlowski, Ellington; Stanley P. Bonk, Tolland, all of Conn.

[73] Assignee: International Fuel Cells, Inc., So. Windsor, Conn.

[21] Appl. No.: 669,187

[22] Filed: Jun. 24, 1996

[51] Int. Cl.$^6$ .................... C01B 3/26; B01J 8/06
[52] U.S. Cl. .............. 423/652; 422/197; 422/203; 422/211; 422/311; 422/312; 48/94; 423/659; 423/DIG. 13
[58] Field of Search ................... 422/197, 203, 422/211, 198, 220, 221, 311, 312; 48/94; 423/652–653, 659, DIG. 13

[56] References Cited

U.S. PATENT DOCUMENTS

| | | | |
|---|---|---|---|
| Re. 23,638 | 3/1953 | Peters | 422/311 |
| 4,098,587 | 7/1978 | Krar et al. | 422/197 |
| 4,098,588 | 7/1978 | Buswell et al. | 422/197 |
| 4,098,589 | 7/1978 | Buswell et al. | 422/197 |
| 4,203,950 | 5/1980 | Sederquist | 422/197 |

Primary Examiner—Hien Tran
Attorney, Agent, or Firm—William W. Jones

[57] ABSTRACT

A steam reformer for converting a reactor fuel into a product gas includes a segmented catalyst bed. The steam reformer side walls have a thermal coefficient of expansion which is greater than the thermal coefficient of expansion of the catalyst. By forming low volume catalyst bed segments in the hotter portions of the catalyst bed, slumping and subsequent damage of the catalyst pellets is minimized. The catalyst bed is divided into segments whose volumes are inversely proportional to the temperatures of the various zones in the reformer. The segments are formed by utilizing sequential catalyst support assemblies which include perforated catalyst support members that are differentially spaced apart from each other by support assembly legs having varying lengths. Catalyst support assemblies with shorter length legs are used in the hotter zones of the reformer, and support assemblies with progressively longer length legs are used in the cooler zones of the reformer.

5 Claims, 2 Drawing Sheets

CATALYTIC REACTOR DESIGNED TO REDUCE CATALYST SLUMPING AND CRUSHING

TECHNICAL FIELD

The present invention relates to an improved catalytic reactor and particularly to a catalytic reactor which resists catalyst slumping and crushing.

BACKGROUND OF THE INVENTION

Steam reformation of a raw reactor fuel, such as a fuel cell hydrocarbon fuel, into a useful process gas, is well known in the art. Steam reformation is accomplished by causing the raw fuel and steam to contact a heated catalyst bed. Typically, temperatures in steam reformers can approach about 1,600° F. Conventional catalytic steam reformer reactors are disclosed in U.S. Pat. No. 4,071,330, U.S. Pat. No. 4,098,587, U.S. Pat. No. 4,098,588, U.S. Pat. No. 4,098,589 and U.S. Pat. No. 4,203,950.

Catalytic steam reformer reactors may experience a problem due to thermal cycling. During start-up, the steam reformer's temperature increases and the reformer walls and the catalyst expand at different rates. The volume between the reformer walls, i.e., the volume of the reformer chamber, expands more than the volume of the catalyst because the reformer walls have a higher coefficient of thermal expansion than the catalyst. The outer reformer wall expands the most because it is in direct contact with combustion gases, while the inner reformer wall also expands, but to a lesser degree. The catalyst expands to the least degree due to the low coefficient of thermal expansion of the catalyst, thereby resulting in a catalyst volume which is less than the expanded volume of the reformer chamber. Once the reformer walls expand, gravity acts upon the catalyst and causes the catalyst to settle downwardly in the reformer chamber, thereby filling voids caused by the increase in chamber volume. This well known phenomenon is known as catalyst "slumping". Slumping can occur in any catalytic reformer having reformer walls with a thermal coefficient of expansion which is greater than the thermal coefficient of expansion of the catalyst particles. During shut-down, when the reformer cools, the reformer walls contract. Since the catalyst has been redistributed downwardly during the heating cycle, cooling of the catalytic reformer and contraction of the walls thereof, results in the reformer walls exerting a mechanical pressure on the catalyst. When this pressure is applied to the catalyst, the weight of the catalyst bed, and friction forces interacting between the catalyst and the reformer walls prevent the catalyst from rising in the catalytic reformer. Some of this mechanical pressure is absorbed by the catalyst and the reformer walls, but the remaining pressure crushes some of the catalyst to form catalyst particles or dust.

Catalyst slumping and resultant crushing causes several problems within a catalytic reformer. The crushed catalyst particles can create a higher drag coefficient than the original catalyst particles, so the product gas stream pressure may entrain the catalyst particles and float them out of the reaction chamber. Other well known problems can result from slumping and crushing of catalyst pellets in the reformer.

The aforesaid U.S. Pat. No. 4,203,950 addresses reformer catalyst slumping and crushing but the solution taught by this patent requires that certain variables with respect to the design of the reformer and the catalyst, such as dimensions and elasticity ranges, be within certain values. The solution offered by this patent is therefore constrained in use.

It would be desirable to provide an improved and simplified catalytic reformer which reduces catalyst slumping and crushing, and does not unduly constrain the utility of the reformer.

DISCLOSURE OF THE INVENTION

This invention relates to a fuel gas reformer assembly which is constructed so as to minimize catalyst slumping and crushing which would otherwise result from operation of the reformer. The catalyst bed in the reformer of this invention is supported on a plurality of vertically spaced-apart fixtures. Each fixture includes a perforated catalyst support portion and a plurality of legs. The fixtures are position one atop the other in the reformer housing, so that a plurality of layers of catalyst, each supported by one of the fixtures, are created in the reformer housing. A mixture of steam and fuel gas to be reformed enters the reformer housing at a lower end thereof, migrates upwardly through the catalyst bed and is then directed back downwardly through the reformer housing. The reformed fuel gas then exits the reformer housing through the lower portion thereof.

The heat needed to drive the reaction is supplied by a heated gas stream which enters the reformer housing through the upper end thereof and is exhausted from the housing through the lower end thereof. The aforesaid manner of supplying heat to the reformer housing results in the upper end of the reformer housing being hotter than the lower end thereof. This, in turn results in the upper end of the reformer catalyst container wall, which is steel, expanding outwardly to a greater degree than the lower end thereof. During normal operation of the reformer, the temperatures at the upper end of the catalyst bed will typically be in the range of about ambient to about 1,600° F., and the temperatures at the lower end of the catalyst bed will typically be in the range of about ambient to about 800° F. During down time, the reformer temperatures will be at ambient levels. When the reformer temperatures are at ambient levels, the reformer housing walls will contract. As noted above, when the reformer wall components expand during operation of the reformer, the catalyst pellets will expand to a lesser degree than the metal wall components, and will therefore tend to slump into the expanded volume in the reformer. The catalyst slumping will be more significant at the hotter end of the reformer than at the cooler end thereof. When the reformer cools down, the reformer housing will contract and can crush catalyst pellets, creating dust and inhibiting the ability of the catalyst pellet bed to perform its function.

In order to minimize catalyst slumping and subsequent catalyst crushing, the fixtures of this invention will be appropriately sized so that the volume occupied by the catalyst layers positioned in the hotter end of the reformer housing will be less than the volume occupied by the catalyst layers in the cooler end of the reformer housing. The catalyst volume variations are achieved by varying the length of the legs which support the layers of the catalyst. The fixture legs will be shorter at the hotter end of the reformer housing, and will gradually lengthen toward the cooler end of the reformer. By providing a plurality of catalyst layers with differing volumes, the degree of slumping and subsequent crushing of catalyst pellets can be minimized.

It is therefore an object of the present invention to provide a fuel gas reformer assembly wherein catalyst slumping resulting from thermal cycling of the reformer is minimized.

It is an additional object of this invention to provide a fuel gas reformer of the character described wherein catalyst crushing resulting from thermal cycling is also minimized.

BEST MODE FOR CARRYING OUT THE INVENTION

Figure 1:
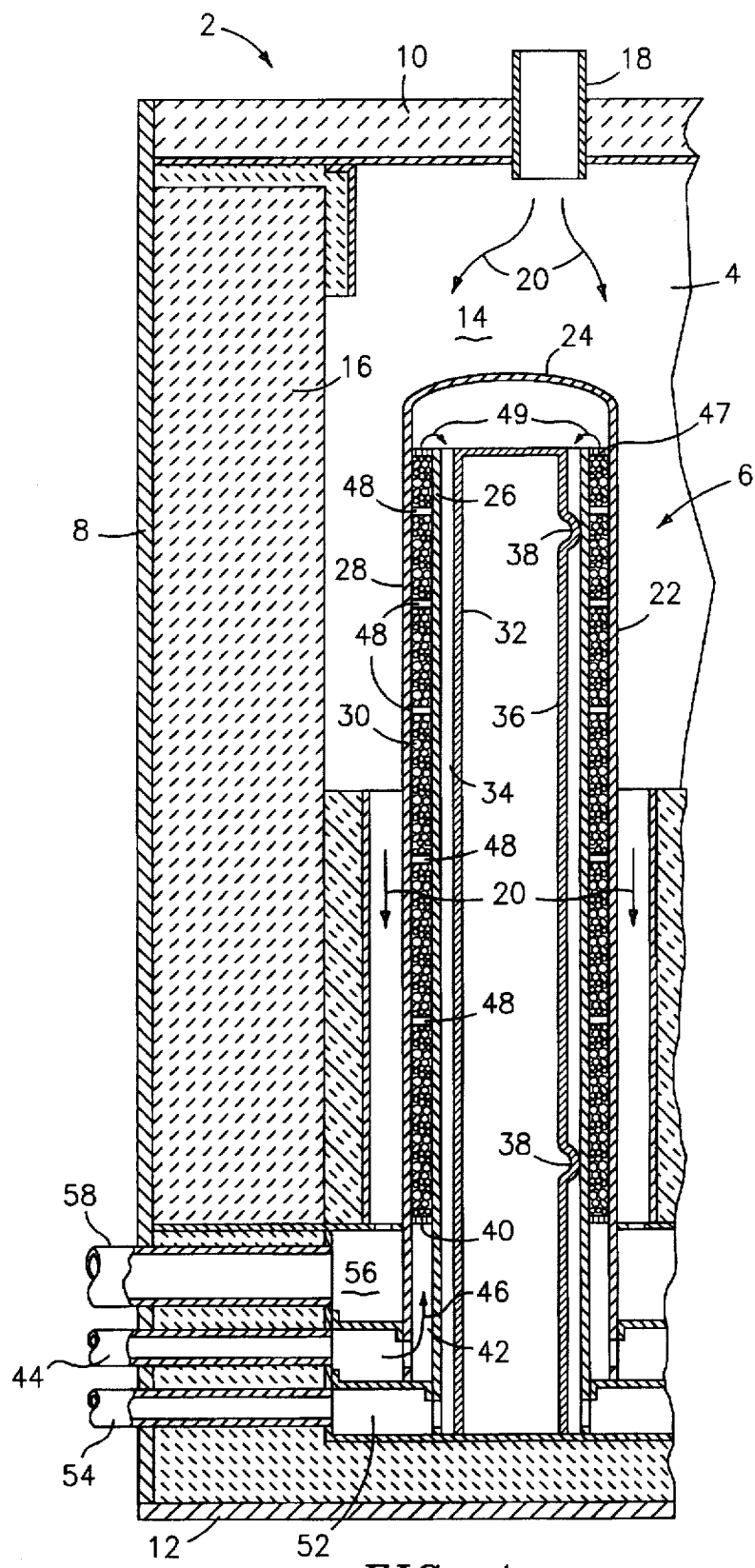
FIG. 1 is a schematic fragmented view of a reformer assembly formed in accordance with this invention.

Referring now to the drawings, FIG. 1 is a fragmented view of an embodiment of a fuel cell reformer assembly which is denoted generally by the numeral 2 and which is formed in accordance with this invention. The reformer assembly 2 includes a cylindrical housing 4 and a plurality of catalyst-filled tubes 6 which are arrayed inside of the housing 4. The housing 4 has an outer side wall 8, a top cover wall 10, and a lower base wall 12. The interior burner cavity 14 of the housing 4 is thermally insulated by layers of insulation 16 so as to retain the necessary reaction temperatures in the burner cavity 14. Heated gas streams consisting of combustion products are supplied to the burner cavity 14 via a plurality of burner tubes 18 which extend through the top cover wall 10, the heated gas streams flowing downwardly into the housing interior 14, as indicated by arrows 20.

Each of the catalyst tubes 6 includes an outer side wall 22 and a closed top wall 24. An inner wall 26 is spaced inwardly of the tube side wall 22 and defines therewith an annular catalyst bed 28 which is filled with catalyzed pellets 30. A suitable catalyst pellet can consist of nickel metal impregnated on an alumina ceramic support whose size may be from one eighth inch to three quarters inch in the form of cylinders, raschig rings, or spheres. A closed innermost tube 32 is disposed inside of the annular wall 26. The tube 32 includes a sidewall 36 which combines with the annular wall 26 to define an annular fuel gas flow path 34. The tube sidewall 36 includes a plurality of protrusions 38 which contact the annular wall 26.

Figure 2:
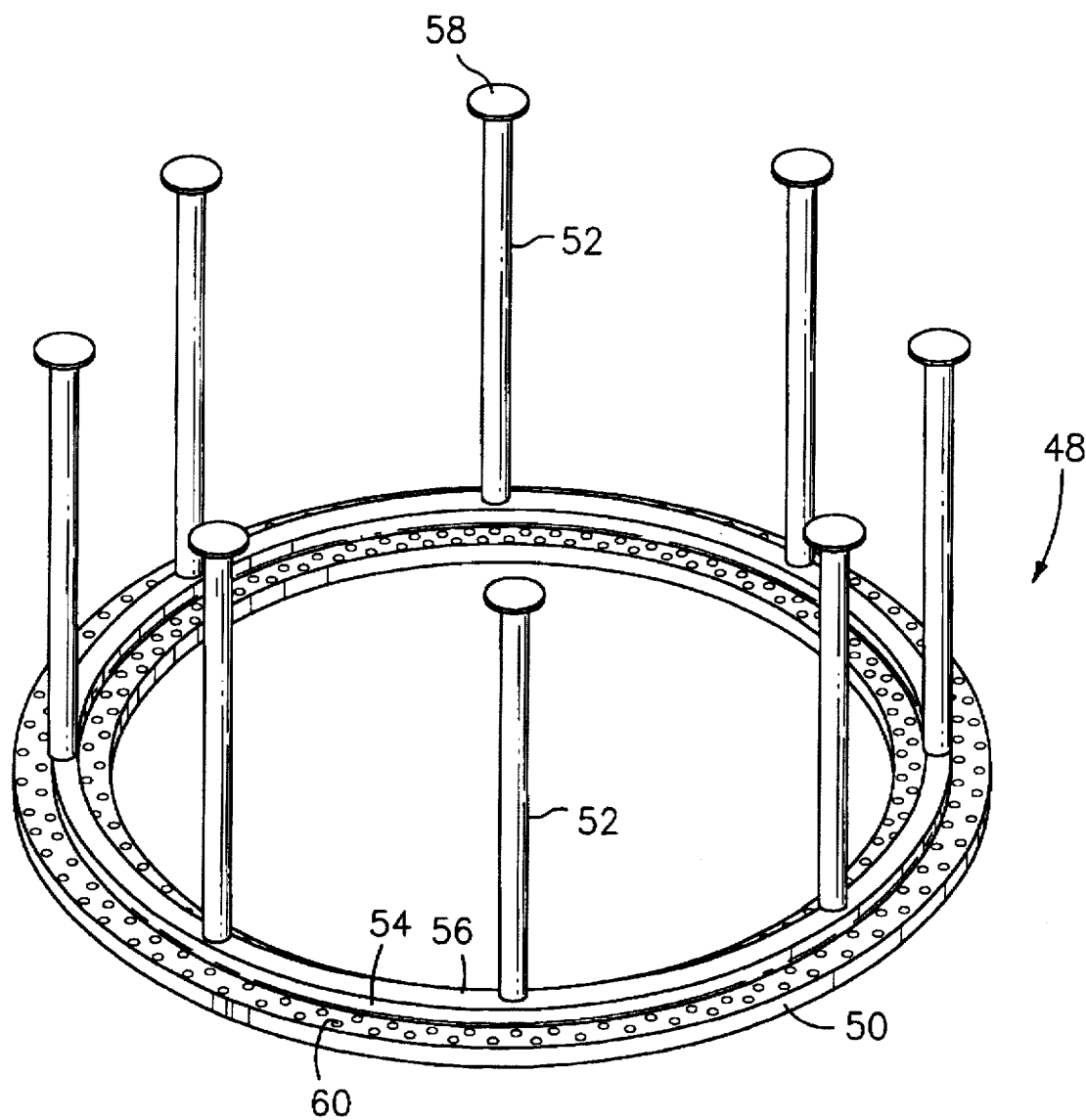
FIG. 2 is a perspective view of a typical catalyst supporting fixture for use in this invention.

The catalyst bed 28 is supported on a perforated plate 40 which is welded only to wall 26 so as to allow freedom of movement between wall 26 and wall 22, and which is disposed above a fuel gas inlet plenum 42. Fuel gas enters the plenum 42 through pipe 44 and flows upwardly through the perforated plate 40, as indicated by arrows 46. The catalyst pellets 30 are supported on a plurality of annular support assemblies 48, details of which are shown in FIG. 2. At the top of the catalyst and support assemblies is a perforated plate 47 which is welded only to wall 26 so as to allow freedom of movement between walls 26 and 22, and which prevents expulsion of the catalyst from the annular catalyst bed 28. Referring to FIG. 2, each support assembly 48 includes a perforated base 50 and a plurality of legs 52 which extend upwardly from the base 50. A reinforcement ring 54 is mounted on the upper surface 56 of the base 50, and supports the legs 52. Each of the legs 52 includes a foot pad 58 on which the next above support assembly 48 rests. The gas flows upwardly through the base 50 via perforations 60. In place of a foot pad, the legs may be bent over so as to form a support for the next perforated plate 40.

Referring back to FIG. 1, it will be noted that there are a plurality of the support assemblies 48 positioned in the catalyst bed 28. These support assemblies 48 slide freely into the catalyst bed annulus and are loaded alternately as catalyst is poured into the annulus 28. The perforated plate 50 is sized to prevent catalyst pellets from passing therearound. The catalyst bed 28 is thus divided into a plurality of adjacent tiers, each of which is supported on one of the support assemblies 48. The reason for including the support assemblies 48 in the catalyst bed 28 is to limit and control slumping of the catalyst pellets 30 when the reformer 2 is operated. When the reformer 2 is brought to operating temperatures, the tubes 6, by expanding radially outwardly due to the high operating temperatures, which are in the range of about 800° F. to about 1,600° F., will cause an expansion of the volume of the catalyst bed 28 so that the catalyst pellets 30, which also expand, but to a lesser degree, will slump down into the bed 28. When the temperature of the reformer 2 is subsequently lowered during shutdown, etc., the tubes 6 will contract radially inwardly, and will crush some of the pellets 30 due to the slumping of the latter. Repeated thermal cycling of the reformer 2 during operation of the power plant can result in damage to the catalyst bed 28, can result in retardation of the gas flow through the catalyst bed, and can result in expulsion of small catalyst particles or dust through the perforated plate 47. By including the support assemblies 48 in the catalyst bed 28, the volume of each layer of catalyst pellets 30 can be controlled. In particular, the length of the legs 52 on each of the support assemblies 48 are varied so that the support assemblies 48 which are disposed in the hot upper end of the catalyst tubes 6 are shorter than the support assemblies 48 which are disposed in the middle and lower cooler portions of the catalyst tubes 6.

As a general rule, the length of the support assemblies 48 will increase from the top hotter end of the catalyst tubes 6 toward the cooler bottom end thereof. The increase may occur in steps or in a gradual manner. By positioning the shorter support assemblies 48 in the hotter areas of the catalyst bed 28, the available space and height for the catalyst pellet slumping phenomenon is limited, and controllable. With the smaller height, the catalyst bed is somewhat free to expand upward during radial compaction, thus relieving the mechanical pressure on the catalyst bed limiting crushing. Also the limited height reduces the weight of the catalyst sections, and thus the tendency of the catalyst sections to slump. Thus, the greater the thermal cycle, or the higher the temperature in the catalyst tubes 6, the shorter the catalyst support assemblies 48 should be. A test simulating the radial expansion at the hotter top end of the catalyst tubes 6 show that by limiting the catalyst bed support assembly height to about three inches in that hotter area of the tubes 6 (about 1,600° F.) results in minimal catalyst damage. At reformer temperatures of about 1,200° F., which can occur in the medial areas of the catalyst tubes 6, minimal catalyst damage will occur with the use of six inch high catalyst support assemblies 48. At reformer temperatures of about 800° F., which can occur in the lower areas of the catalyst tubes 6, minimal catalyst damage will occur with the use of twelve inch high catalyst support assemblies 48. The aforesaid values are approximate and are intended to reflect general rules or principals which can be used to design a reformer catalyst support system. These values may obviously be modified to accommodate variations in reformer geometry; the number of anticipated thermal cycles for the reformer during its expected operating life; and the amount of catalyst damage that could be tolerated by the reformer in question. The varied spacing of the catalyst support assemblies 48 shown in FIG. 1 is intended to demonstrate the operating principals of the invention.

Further details of the reformer assembly 2 construction, and its mode of operation, are as follows. The fuel gas to be reformed enters the reformer assembly 2 through gas inlet pipe 44 and flows upwardly through the catalyst bed 28. The gas stream is catalytically reformed in the bed 28, and exits from the bed 28 through the perforated plate 47 thereof, whereupon it reverses its direction of flow, as indicated by arrows 49, and enters the annular gas flow path 34. The reformed gas stream flows downwardly through the space 34 into an exit plenum 52, and thence to an exit line 54. At the same time, the hot burner gas stream enters the assembly 2 via burner gas inlet tubes 18 and flows downwardly past the catalyst tubes 6 to a burner gas exit plenum 56 and thence to a burner gas exit line 58. As the burner gas stream flows downwardly through the reformer assembly 2 its temperature cools from about 2,100° F.–2,500° F. to about 700° F.–1,100° F. in an essentially linear fashion.

It will be readily appreciated that a fuel cell power plant reformer assembly which includes a segmented catalyst bed formed in accordance with this invention can limit catalyst bed damage during thermal cycling of the reformer. By segmenting the catalyst bed with disparate catalyst support assemblies which provide smaller catalyst segment volumes in hotter portions of the reformer, slumping of the catalyst pellets in the hotter zones of the reformer can be minimized and subsequent damage to the pellets can also be minimized. The support assemblies which are disposed in the cooler zones of the catalyst bed can provide larger volume segments for the catalyst pellets. The volume of the catalyst bed segments is controlled by appropriately sizing the length of the support assembly legs.

Since many changes and variations of the disclosed embodiment of the invention may be made without departing from the inventive concept, it is not intended to limit the invention otherwise than as required by the appended claims.

What is claimed is:

1. A steam reformer assembly for converting a reactor fuel into a process gas, said assembly having a catalyst disposed therein forming a catalyst bed having a gas flow inlet and a gas flow outlet, such that the reactor fuel and steam flow in contact with the catalyst bed, said assembly including a catalyst container for said catalyst bed which has a thermal coefficient of expansion that is greater than that of the catalyst, said catalyst bed and catalyst container being subjected to operating temperatures and temperature cycles which are sufficient to alternately increase the volume of the catalyst container to a degree that will allow the catalyst bed to slump, and decrease the volume of the catalyst container to a degree that will subject the catalyst to crushing, said assembly comprising:

a) a plurality of catalyst support assemblies for dividing the catalyst bed into a plurality of catalyst tiers, said catalyst support assemblies each comprising a perforated base for supporting a respective one of the catalyst bed tiers, said base allowing the flow of reactor fuel and steam through the catalyst tiers and a plurality of legs which extend from said base and which support a next adjacent one of said support assemblies in the catalyst bed; and b) the legs on support assemblies which are disposed in hotter outlet areas of the catalyst bed being shorter than the legs on support assemblies which are disposed in cooler inlet areas of the catalyst bed so as to reduce the amount of slumping and subsequent crushing of the catalyst bed in said hotter outlet areas of the catalyst bed.

2. The assembly of claim 1 wherein the support assembly bases further comprise a stiffening member thereon, said legs being mounted on said stiffening member.

3. The assembly of claim 1 wherein the spacing between adjacent support assemblies increases stepwise from a hottest outlet end of said catalyst bed to a coolest inlet end of said catalyst bed.

4. A method for minimizing catalyst bed slumping and subsequent catalyst crushing which may occur during thermal cycling of a fuel gas steam reformer assembly, said method comprising the steps of:

a) providing a catalyst bed having a gas flow inlet and gas flow outlet, for converting a fuel gas stream into a hydrogen-enriched process gas stream; and b) dividing said catalyst bed into a plurality of separate tiers for supporting separate fractions of the catalyst in the catalyst bed, with tiers of the catalyst in hotter operating outlet portions of the catalyst bed having a volume and height which is less than the volume and height of tiers of the catalyst in cooler operating inlet portions of the catalyst bed, each tier in the catalyst bed being sized so as to limit the volume and height available in the tier for catalyst slumping during high temperature operation of the reformer assembly, and to limit the volume and height available in the tier for catalyst crushing during lower temperature operation of the reformer assembly.

5. The method of claim 4 wherein the volume and height of the catalyst bed tiers increases stepwise from a higher temperature outlet end of the catalyst bed to a lower temperature inlet end of the catalyst bed.

* * * * *